US009606900B1

(12) United States Patent
Pradhan et al.

(10) Patent No.: US 9,606,900 B1
(45) Date of Patent: Mar. 28, 2017

(54) INTELLIGENT AUTOMATION OF COMPUTER SOFTWARE TEST SCRIPTS AND CODE REQUIREMENTS

(71) Applicant: FMR LLC, Boston, MA (US)

(72) Inventors: Amit Pradhan, Cary, NC (US); Sameer Ponkshe, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/079,662

(22) Filed: Mar. 24, 2016

(51) Int. Cl.
  G06F 9/44 (2006.01)
  G06F 11/36 (2006.01)
  G06F 17/27 (2006.01)
  G06F 17/30 (2006.01)

(52) U.S. Cl.
  CPC ........... G06F 11/368 (2013.01); G06F 8/71 (2013.01); G06F 17/2725 (2013.01); G06F 17/30106 (2013.01)

(58) Field of Classification Search
  None
  See application file for complete search history.

(56) References Cited

U.S. PATENT DOCUMENTS

| | | | | |
|---|---|---|---|---|
| 6,249,882 B1 * | 6/2001 | Testardi | ............... | G06F 11/3672 714/38.14 |
| 6,694,509 B1 * | 2/2004 | Stoval | ................. | G06F 11/3688 707/999.202 |
| 7,490,319 B2 * | 2/2009 | Blackwell | ........... | G06F 11/3664 717/124 |
| 7,900,192 B2 * | 3/2011 | Patterson | .............. | G06F 9/4443 706/48 |
| 8,151,276 B2 * | 4/2012 | Grechanik | ................ | G06F 8/38 717/115 |
| 8,205,191 B1 | 6/2012 | Kolawa et al. | | |
| 8,561,036 B1 * | 10/2013 | Beans | ................... | G06F 11/368 717/124 |
| 8,645,341 B2 | 2/2014 | Salman et al. | | |
| 8,732,676 B1 | 5/2014 | Kolawa et al. | | |
| 8,972,946 B2 * | 3/2015 | Bullard | ................. | G06F 11/368 717/125 |

(Continued)

OTHER PUBLICATIONS

Parasoft Corporation, "Test-Driven Development and Unit Testing with Parasoft Concerto," dated 2010, 10 pages.

(Continued)

Primary Examiner — Evral E Bodden
(74) Attorney, Agent, or Firm — Proskauer Rose LLP

(57) ABSTRACT

Methods and apparatuses are described for intelligent automation of computer software test scripts and code requirements. A server automatically scans code files to identify changes made to the code files. The server selects test automation script files that are related to the changed code files. The server parses each selected script file to determine whether the script file includes changes that correspond to the changes made to the related code files. If the script file includes the corresponding changes, the server determine whether a current version of the script file is located on each of one or more test servers and installs the current version of the script file on each test server that does not have the current version. If the script file does not include the corresponding changes, the server transmits a message to a remote computing device to indicate that the script file requires the corresponding changes.

25 Claims, 5 Drawing Sheets

(56) References Cited

U.S. PATENT DOCUMENTS

| | | | | |
|---|---|---|---|---|
| 9,411,710 B2* | 8/2016 | Kumar | ................ | G06F 11/3676 |
| 2005/0223361 A1* | 10/2005 | Belbute | .............. | G06F 11/3688 |
| | | | | 717/124 |
| 2007/0245327 A1* | 10/2007 | Dietz | ........................ | G06F 8/74 |
| | | | | 717/143 |
| 2012/0023485 A1* | 1/2012 | Dubey | ...................... | G06F 8/30 |
| | | | | 717/125 |
| 2013/0298110 A1* | 11/2013 | Boden | ................ | G06F 11/3676 |
| | | | | 717/125 |

OTHER PUBLICATIONS

Hornbeek, M., "Continuous Change-Driven Build Verification," Spirent Communications, dated 2011, 11 pages.

\* cited by examiner

| Keyword | Application Table | Automation Table | Build Table | ScriptServer | ApplicationWeb Service | DEPLOYMENT |
|---|---|---|---|---|---|---|
| Portfolio Chart | PortfolioChart | HelloWorld_Sahi_Script | Portfolio Chart | HelloWorld_Sahi_Script.sah | PortfolioChart | PortfolioChart |
| Portfolio | PortfolioChart | HelloWorld_Sahi_Script | Portfolio Chart | HelloWorld_Sahi_Script.sah | PortfolioChart | PortfolioChart |

FIG. 3

INTELLIGENT AUTOMATION OF COMPUTER SOFTWARE TEST SCRIPTS AND CODE REQUIREMENTS

TECHNICAL FIELD

This application relates generally to methods and apparatuses, including computer program products, for intelligent automation of computer software test scripts and code requirements.

BACKGROUND

Automated testing and analysis of complex source code and related development tools using automation scripts is crucial to understanding the functional impact of source code changes across a wide variety of systems in a timely and efficient manner. Identifying the coverage of such automation scripts for a particular code release is typically based on the knowledge and experience of the developers and programmers assigned to the project. In order to leverage this knowledge and experience, it generally takes significant effort to perform certain tasks—including identification of related or dependent code modules that are affected when a code change is made to other areas of the project. Further, such effort does not guarantee reduction of the risks of later incidents or errors once the software goes into production because often the concept of application code level coverage and dependencies is overlooked.

In addition, the understanding of source code requirements and their relationship to the automation scripts is a time-intensive process. Although, various tools exist for generating source code requirements, these requirements are typically mapped manually to the test automation scripts—again based on the knowledge and experience of developers and programmers. Therefore, it is challenging to determine the technical coverage of the test cases pulled for that release. Often, a person must manually add/update/move applicable test scripts for each build or release every time if these test scripts are running in continuous integration and deployment (CI/CD) environments. This manual process results in significant hurdles where there are multiple source code builds per day and when the development team wants to run scripts applicable to each build. Currently, there are no tools to quantify the selection of impacted test scripts while automatically considering the specific technical details of the source code and its dependencies.

SUMMARY

Therefore, what is needed are methods and systems for an intelligent test automation engine to reduce the risk of error and production incidents in the source code base by doing automated, intelligent technical code analysis of test automation scripts and the application source code, finding relationships between the scripts and the source code, and assessing functional impacts of changes to the source code and/or the test scripts by analyzing the software at the code level and using the development requirements as a guide. The methods and systems described herein efficiently provide more predictable coverage for automated tests to be considered during each source code build—resulting in increase in focused technical coverage and decreased dependency on manual knowledge of developers. As a result, the development cycle experiences a significantly reduced production environment failure or error risk.

The methods and systems described herein provide the following further advantages:

a) identifying and implementing test automation script changes based upon scanning for changes in the source code base;

b) identifying which test automation scripts to run based upon keywords, tags, and/or values that are used in the source code requirements;

c) displaying implementation success index based on past test automation script execution for those keywords;

d) automatically linking test automation scripts to source code requirements;

e) automatically triggering execution of test automation scripts immediately after a software build deployment based upon the source code changes that are part of the build;

f) generating historical test analysis data for the developer who worked on a certain part of the code, determining the success criteria for the developer/code segment, and determining who would be a preferred developer to work on that code segment to reduce implementation time and increase quality; and g) understanding and predicting outcome in terms of time required to make changes to the source code and/or a particular segment of code.

The invention, in one aspect, features a computerized method for intelligent automation of computer software test scripts and code requirements. A server computing device automatically scans a plurality of code files stored in a code repository that comprise one or more lines of application source code to identify changes made to the code files. The server computing device selects one or more test automation script files from a test script repository that are related to the changed code files. The server computing device parses each selected test automation script file to determine whether the selected test automation script file includes changes that correspond to the changes made to the related code files. If the selected test automation script file includes the corresponding changes, the server computing device determines whether a current version of the selected test automation script file is located on each of one or more test server computing devices and installs the current version of the selected test automation script file on each test server computing device that does not have the current version. If the selected test automation script file does not include the corresponding changes, the server computing device transmits a notification message to a remote computing device to indicate that the selected test automation script file requires the corresponding changes.

The invention, in another aspect, features a system for intelligent automation of computer software test scripts and code requirements. The system includes a server computing device configured to automatically scan a plurality of code files stored in a code repository that comprise one or more lines of application source code to identify changes made to the code files, select one or more test automation script files from a test script repository that are related to the changed code files, and parse each selected test automation script file to determine whether the selected test automation script file includes changes that correspond to the changes made to the related code files. If the selected test automation script file includes the corresponding changes, the server computing device is configured to determine whether a current version of the selected test automation script file is located on each of one or more test server computing devices, and install the current version of the selected test automation script file on each test server computing device that does not have the current version. If the selected test automation script file does not include the corresponding changes, the server computing device is configured to transmit a notification message to a remote computing device to indicate that the selected test automation script file requires the corresponding changes.

The invention, in another aspect, features a computer program product, tangibly embodied in a non-transitory computer readable storage device, for intelligent automation of computer software test scripts and code requirements. The computer program product includes instructions operable to cause a server computing device to automatically scan a plurality of code files stored in a code repository that comprise one or more lines of application source code to identify changes made to the code files, select one or more test automation script files from a test script repository that are related to the changed code files, and parse each selected test automation script file to determine whether the selected test automation script file includes changes that correspond to the changes made to the related code files. If the selected test automation script file includes the corresponding changes, the server computing device determines whether a current version of the selected test automation script file is located on each of one or more test server computing devices, and installs the current version of the selected test automation script file on each test server computing device that does not have the current version. If the selected test automation script file does not include the corresponding changes, the server computing device transmits a notification message to a remote computing device to indicate that the selected test automation script file requires the corresponding changes.

Any of the above aspects can include one or more of the following features. In some embodiments, for each of the plurality of code files, automatically scanning includes determining whether a timestamp of the code file has changed and extracting one or more data elements associated with the code file and storing the data elements in a database, if the timestamp of the code file has changed. In some embodiments, extracting one or more data elements includes parsing a folder structure in which the code file is located to identify at least a portion of the data elements associated with the code file. In some embodiments, extracting one or more data elements includes parsing a configuration file of an application associated with the code file to identify at least a portion of the data elements associated with the code file. In some embodiments, one or more data elements includes parsing the one or more lines of application source code contained in the code file to identify at least a portion of the data elements associated with the code file. In some embodiments, extracting one or more data elements includes parsing a build file of an application in which the code file is included to identify at least a portion of the data elements associated with the code file.

In some embodiments, parsing the selected test automation script file includes extracting, by the server computing device, one or more data elements associated with the selected test automation script file and storing the data elements in the database. In some embodiments, extracting one or more data elements associated with the selected test automation script file includes parsing a folder structure in which the selected test automation script file is located to identify one or more data elements associated with the selected test automation script file. In some embodiments, extracting one or more data elements associated with the selected test automation script file includes parsing one or more lines of script code contained in the selected test automation script file to identify one or more data elements associated with the selected test automation script file.

In some embodiments, the server computing device generates a search index that aggregates at least a portion of the data elements associated with the code file and at least a portion of the data elements associated with the test automation script file. In some embodiments, the server computing device identifies a code file by scanning the search index using one or more of the data elements associated with the test automation script file. In some embodiments, the server computing device identifies a test automation script file by scanning the search index using one or more of the data elements associated with the code file. In some embodiments, the server computing device determines whether the changed code files are included in a code build to be deployed on the test server computing devices and instructs the test server computing devices to execute the current versions of the selected test automation scripts if the changed code files are included in the code build.

In some embodiments, the server computing device receives one or more keywords associated with a code change requirement from an application lifecycle management system, identifies at least one code file and at least one test automation script file based upon the keywords, and links the identified code file and the identified test automation script file to a user interface of the application lifecycle management system.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an optimized index for mapping keywords with related source code components and automated test scripts.

DETAILED DESCRIPTION

Figure 1:
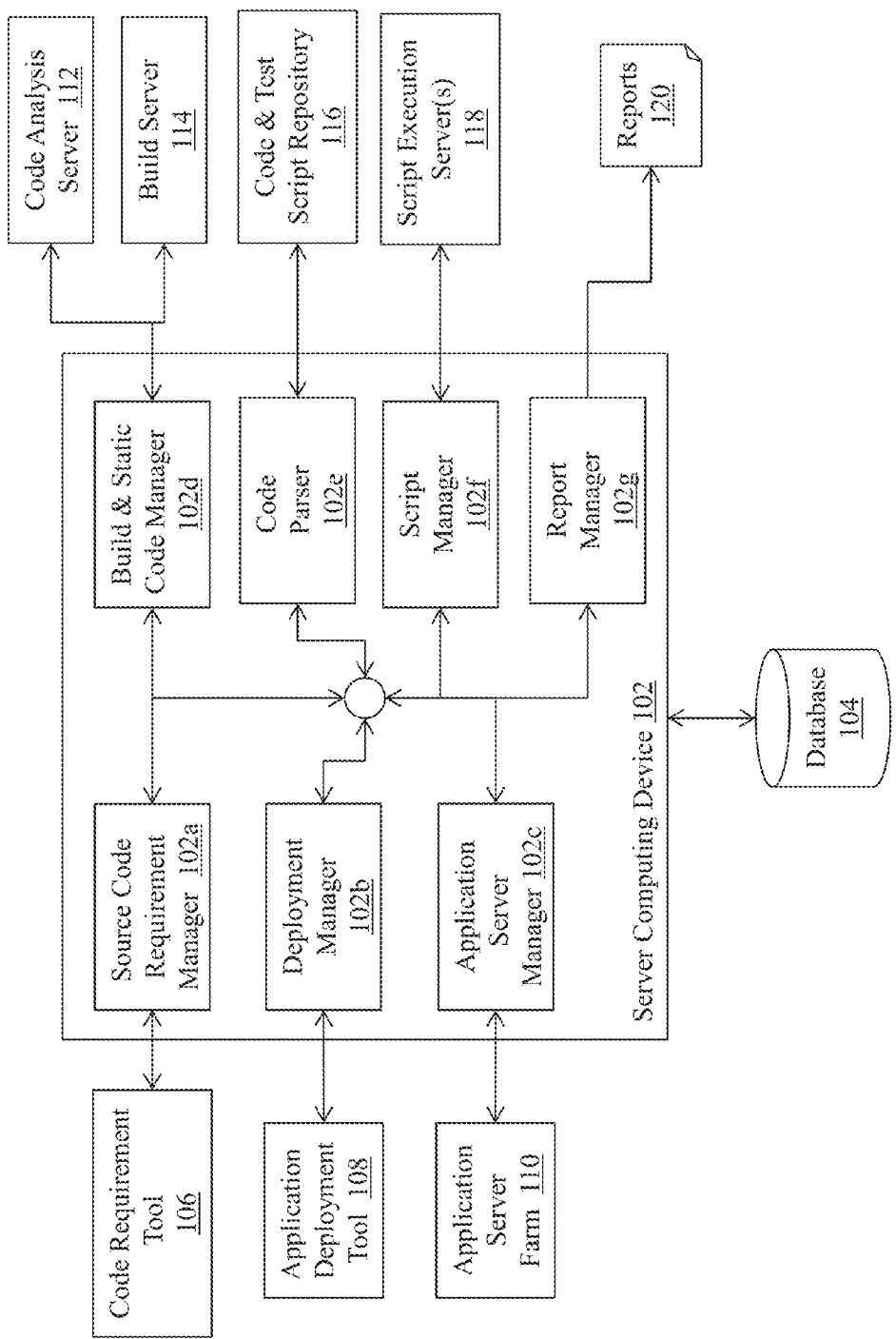
FIG. 1 is a block diagram of a system for intelligent automation of computer software test scripts and code requirements.

FIG. 1 is a block diagram of a system 100 for intelligent automation of computer software test scripts and code requirements. The system 100 includes a server computing device 102 with several computing modules including a source code requirement manager 102*a*, a deployment manager 102*b*, an application server manager 102*c*, a build and static code manager 102*d*, a code parser 102*e*, a script manager 102*f*, and a report manager 102*g*. The system 100 also includes a database 104 coupled to the server computing device 102.

In addition, the system 100 includes a code requirement tool 106 coupled to the source code requirement manager 102*a*, an application deployment tool 108 coupled to the deployment manager 102*b*, and an application server farm 110 coupled to the application server manager 102*c*. The system 100 further includes a code analysis server 112 and a build server 114 coupled to the build and static code manager 102*d*, a code and test script repository 116 coupled to the code parser 102*e*, and script execution server(s) 118 coupled to the script manager 102*f*.

The server computing device 102 is a combination of hardware and software modules that includes specialized hardware and/or software modules that execute on a processor and interact with memory modules of the server computing device 102, to receive data from other components of the system 100, transmit data to other components of the system 100, and perform functions for intelligent automation of computer software test scripts and code requirements as described herein. The server computing device 102 includes several computing modules 102*a*-102*g* (as mentioned above) that execute on the processor of the server computing device 102. In some embodiments, the modules 102*a*-102*g* are specialized sets of computer software instructions programmed onto one or more dedicated processors in the server computing device 102 and can include specifically-designated memory locations and/or registers for executing the specialized computer software instructions. Although the modules 102*a*-102*g* are shown in FIG. 1 as executing within the same server computing device 102, in some embodiments the functionality of the modules 102*a*-102*g* can be distributed among a plurality of server computing devices. As shown in FIG. 1, the server computing device 102 enables the modules 102*a*-102*g* to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 102*a*-102*g* is described in detail below.

The source code requirement manager 102*a* provides functionality to communicate with various modules and plug-ins within the code requirement tool 108 in order to exchange information (e.g., keywords, tags) relating to code requirements that are being implemented or will be implemented in the source code. An exemplary code requirement tool 108 is an application lifecycle management (ALM) tool, such as JIRA™ available from Atlassian, Inc., that is used for software development project tracking. In some embodiments, the source code requirement manager 102*a* can monitor the information contained within the code requirement tool 108 (e.g., story description, story details, status, release name, project name, other tags and/or text fields, and the like) to parse and extract certain keywords and/or tags used in the code requirement tool 108. The source code requirement manager 102*a* uses the extracted keywords/tags to identify test automation scripts and source code components that relate to the requirement keywords and tags, and to determine the name and purpose of certain source code modules that are called in test automation scripts—including the number of times the code module is called, the specific code functions called, and the number of dependent functions and modules.

The deployment manager 102*b* provides functionality to communicate with the application deployment tool 108 in order to provide information to the application deployment tool 108 that relates to new code builds that are pushed to the application server(s) 110. For example, the deployment manager 102*b* can identify and keep track of which build(s) (e.g., build name, build number, date, and the like) are being deployed to which server(s) in the application server farm 110. This tracking assists other components of the system 100 in determining where certain code builds and underlying changes are deployed, when further changes are necessary or in development.

The application server manager 102*c* provides functionality to communicate with each server computing device within the application server farm 110 in order to collect information from the servers about what application(s) are deployed. The application server farm 110 comprises a plurality of computing devices that execute application(s) for which the source code is generated and tested. For example, the application server manager 102*c* can scan the file system of each server computing device in the application server farm 110 to determine whether any application(s) are found. If application(s) are found, the application server manager 102*c* can collect information about the specific files (e.g., .war, .jar, .exe, .dll) located on each server in the farm 110 and transmit the information to the database 104.

The build and static code manager 102*d* provides functionality to communicate with the code analysis server 112 to provide insight into the complexity of code modules residing within various software builds and to communicate with the build server 114 to monitor and analyze characteristics associated with the builds. For example, the build and static code manager 102*d* can provide a build to the build server 114, which analyzes the build to extract and parse certain attributes and metrics corresponding to the build—such as the build script name including the build code location/path and the code module name(s), the build output filename (e.g., .war, .jar, .exe), the time when the build compilation was triggered, the outcome of the build (e.g., SUCCESS, ERROR), and the duration for the build to complete compilation. The build and static code manager 102*d* can communicate with the code analysis server 112 to receive information from the server 112 relating to analysis of the source code underlying a particular build to understand certain aspects of the complexity of the code—including items like the number of lines of code in a particular method, the number and identity of function calls, statements, and the like within the method, the number and nature of the comments embedded in the method/module, if there are any public API calls in the method, and other items like classes, number of children, depth in tree, and response for class. The code analysis server 112 can also determine whether the particular code includes any rules violations or other errors.

The code parser 102*e* provides functionality to communicate with the code and test script repository 116 to scan the source code base (including the test automation scripts code) that is stored in the repository 116 whenever the code is changed, in order to understand the nature and scope of the changes and store the information (e.g., in the database 104). For example, the code parser 102*e* scans each line of application source code and the test automation scripts to look for items such as: code or script file name, functionalities in the code (e.g., publicly exposed methods), any URLs that are referenced, the date that the code/script was created, the date that the code/script was changed, any function dependencies, any function parameters (e.g., number of arguments, data types), keywords, tags, comments, page objects that are utilized by both test automation scripts and source code, web service end points, database tables (e.g., usage, connection), data files (including all format types), and so forth. The code parser 102e also maintains a record of historical code parses so that changes to the code base and test scripts can be easily tracked.

The script manager 102f provides functionality to communicate with the script execution server(s) 118 to identify the test automation scripts to be executed against the server(s) 118 and trigger execution of the scripts. After each execution run, the script manager 102f collects and tracks the results—including, e.g., which script(s) were executed on which server(s) 118, the number and identity of servers 118 that ran the scripts successfully and the number and identity of servers 118 that did not run them successfully, the number and identity of servers 118 on which the script(s) were not run at all, and so forth. The script manager 102f also includes functionality to keep track of newly added scripts in the code and test script repository 116 and ensure that the scripts the manger 102f executes are in sync with the repository 116. The script manager 102f also includes a script parser that manages a historical record of scripts that were executed for prior builds—including which functions, components, and the like were called as part of the execution. The script manager 102f can store the results of the script execution—like log data, execution data, output files, and so forth—in the database 104.

The report manager 102g provides functionality to generate reports 120 based upon the activities performed by the other modules in the system 100. The reports can take the form of text-based and/or graphical representations of the analysis data generated by the other modules. For example, the report manager 102g can generate reports on items such as:

- Most frequently used code components—an understanding of which code components are most frequently used provides insight into the impact that changes to these components may have in the overall code base and application stability/operation;
- Least frequently used code components—similar to the previous item, an understanding of which code components are rarely used;
- Concentration of errors and defects—identification of which functionalities, code components, and systems (e.g., servers, applications) that have a higher frequency of defects or errors in code; and
- Performance issues—identification of less-than-optimal performance relating to specific code components, functionalities, database queries (e.g., requests and responses), and networking/server responses.

The report manager 102g also includes a plug-in based solution to support the reading of an output file from, e.g., various automation programming languages and tools (including the modules of system 100) that execute on the script execution servers 118. For example, certain tools on the script execution servers 118 may generate output files that contain data relating to the results of the script execution. The report manager 102g can determine the existence of any newly-created and/or updated output files in the script execution server environment and initialize functionality to parse the contents of the files and save the parsed data in, e.g., database 104 for future reference and analysis.

It should be appreciated that the components of the system 100 can be configured to communicate via a communication network (not shown) in order to exchange information as described herein. The network may be a local network, such as a LAN, or a wide area network, such as the Internet. The network may communicate via a packet-based protocol (e.g., IP). In some embodiments, the network is comprised of several discrete networks and/or sub-networks (including related routing, load balancing, and traffic metering hardware).

The database 104 is a computing device (or in some embodiments, a set of computing devices) coupled to the server computing device 102 and is configured to receive, generate, and store specific segments of data relating to the process of intelligent automation of computer software test scripts and code requirements as described herein. In some embodiments, all or a portion of the database 104 can be integrated with the server computing device 102 or be located on a separate computing device or devices. The database 104 can comprise one or more databases configured to store portions of data used by the other components of the system 100, as will be described in greater detail below. An exemplary database 104 is MySQL™ available from Oracle Corp. of Redwood City, Calif.

Figure 2:
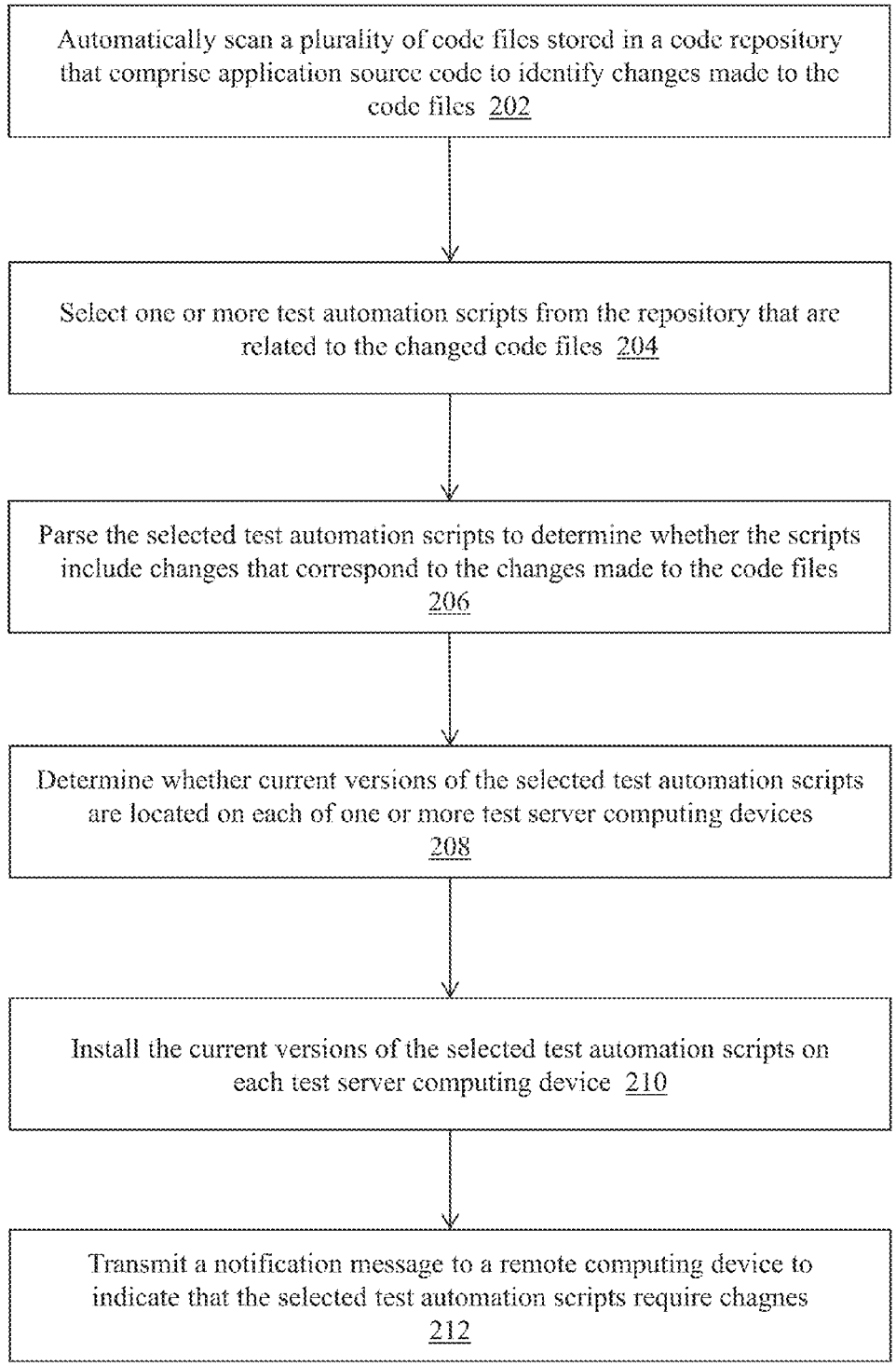
FIG. 2 is a flow diagram of a method for intelligent automation of computer software test scripts and code requirements.

FIG. 2 is a flow diagram of a method for intelligent automation of computer software test scripts and code requirements, using the system 100 of FIG. 1. The code parser 102e of server computing device 102 automatically scans (202) a plurality of code files stored in a code repository (e.g., repository 116) that comprise one or more lines of application source code to identify changes made to the code files. The script manager 102f of server computing device 102 selects (204) one or more test automation scripts from the repository 116 that are related to the changed code files. The code parser 102e parses (206) the selected test automation scripts to determine whether the selected test automation scripts include changes that correspond to the changes made to the code files. If the selected test automation scripts include the corresponding changes, the script manager 102f determines (208) whether current versions of the selected test automation scripts are located on each of one or more test server computing devices (e.g., script execution servers 118) and installs (210) the current versions of the selected test automation scripts on each test server computing device 118 that does not have the current versions. If the selected test automation scripts do not include the corresponding changes, the server computing device 102 transmits (212) a notification message to a remote computing device to indicate that the selected test automation scripts require the corresponding changes.

The server computing device 102 also executes an index and search algorithm that analyzes the data elements collected and stored by the respective modules 102a-102f of the system 100 to generate an optimized index in the database 104 that maps keywords with the related source code components and automated test scripts. The modules 102a-102f can leverage this index to quickly identify and connect related objects, components, files, functions, pages, page objects, test data and other code and script-related items. In one example, a developer may want to create a requirement to update certain aspects of the PortfolioChart application. The developer enters the keyword "PortfolioChart" into the code requirement tool 106 to create the requirement. The source code requirement manager 102a identifies the "PortfolioChart" keyword and scans the index generated by the index and search algorithm using the keyword. An example of the index is shown in FIG. 3. The leftmost column includes the keyword, and the other columns indicate the respective elements of the source code base, automation scripts, and other application data that relate to the keyword. The source code requirement manager 102a uses the entries in each row of the index to retrieve specific information about the PortfolioChart application from each of the tables generated by the other modules 102b-102f as described above. For example, the source code requirement manager 102a identifies from the index that the HelloWorld_Sahi_Script.sah script file is associated with the PortfolioChart application. The source code requirement manager 102a quickly locates the HelloWorld_Sahi_Script.sah script file in the code and test script repository 116 and collects information about the script file (including, in some embodiments, the script file itself). The source code requirement manager 102a can then use the collected information in conjunction with the code requirement tool 106 when new requirements are created that impact the PortfolioChart application, as is described in greater detail in the below use cases.

Figure 4:
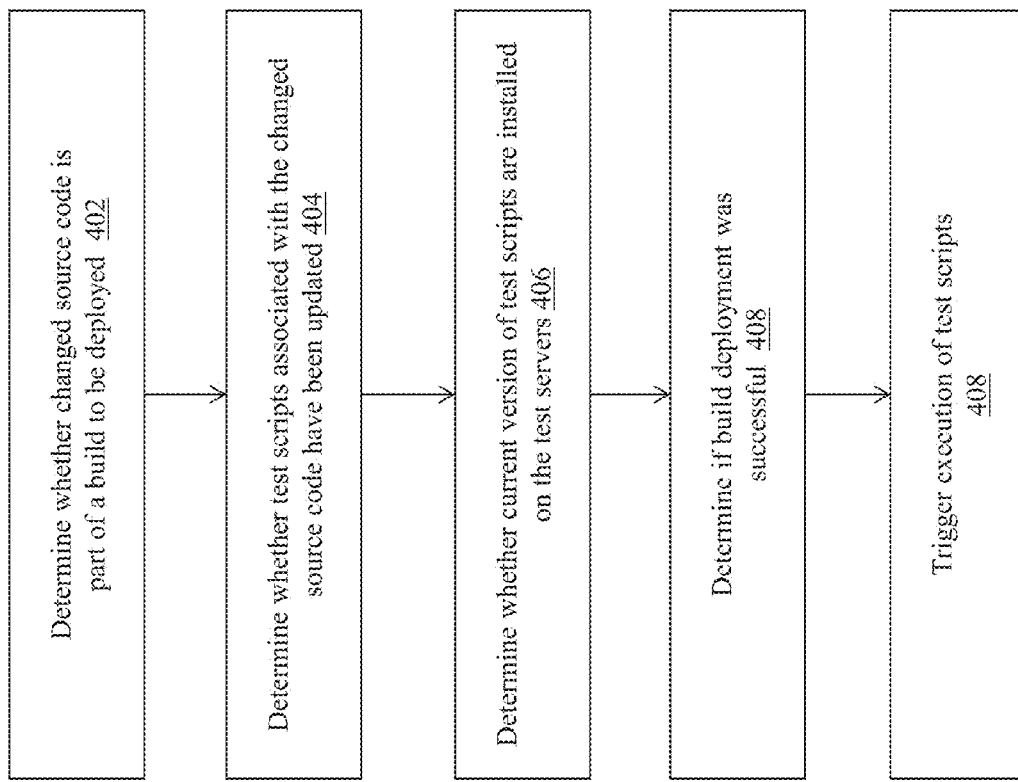
FIG. 4 is a flow diagram of a method for automatically triggering execution of test automation scripts based upon an application build.

The system 100 of FIG. 1 can also be used to automatically trigger the execution of test automation scripts that are associated with source code changes that become a part of an application build and deployment. FIG. 4 is a flow diagram of a method for automatically triggering execution of test automation scripts based upon an application build, using the system 100 of FIG. 1. As described earlier, the system (e.g., code parser 102e) scans the source code base (including the test automation scripts code) in order to understand the nature and scope of the changes and store the information in the database 104. During that scanning process, the deployment manager 102b determines (402) whether the changed source code is part of a source code build that is being deployed (e.g., to script execution server 118 and/or application server farm 110). If so, the code parser 102e determines (404) whether the test automation scripts that are associated with the changed source code have already been updated to account for the source code changes. If the test automation scripts have not been updated, in some embodiments the code parser 102e issues a notification message to a remote computing device (e.g., a developer terminal) that the test automation scripts are out of date and need to be changed. In some embodiments, the code parser 102e can determine if any of the changes to the source code have a material impact on the execution of the test automation scripts (e.g., have any arguments changed) and similarly notify a remote computing device if a material impact is determined. If there is not a material impact detected, the code parser 102e can continue with the automatic execution of the scripts.

If the code parser 102e determines that the test automation scripts have already been updated, the code parser 102e determines (406) whether the current (or latest) version of the scripts are on the script execution servers 118. If not, the code parser 102e notifies the remote computing device. If the current versions of the scripts are available on the servers 118, the deployment manager 102b determines (408) if the build deployment was successful. If the deployment was not successful, the deployment manager 102b notifies the remote computing device. If the deployment was successful, the script manager 102f triggers (410) execution of the scripts on the script execution servers 118. Once execution of the scripts is complete, the script manager 102f can parse output received from the script execution servers 118 and store the parsed data in the database 104.

Figure 5:
FIG. 5 is a screenshot a user interface for an ALM tool that is integrated with the system of FIG. 1 for intelligent automation of computer software test scripts and code requirements.

The system 100 of FIG. 1 can also be used to perform automatic identification of impacted source code elements and test script elements using a code requirement tool 106, such as an ALM tool. FIG. 5 is a screenshot of a user interface for an ALM tool (e.g., code requirement tool 106) that is integrated with the system of FIG. 1. As shown in FIG. 5, a developer is creating a requirement for a change to the functionality of an application—in this case, the developer is adding a JIRA story to enable a user to change the frequency of charts to "monthly" so that the user can see the current value of his or her investments. The developer selects an Issue Type (e.g., "Story") from the drop-down menu at the top of the interface, and selects the Portfolio Summary epic to assign the new issue. The developer enters a Story Theme of "Portfolio Monthly Chart," and enters information as shown into the Summary and Description fields.

It should be appreciated that the source code requirement manager 102a is plugged into the code requirement tool 106 so that as the developer enters the information into the code requirement tool's 106 user interface, the source code requirement manager 102a automatically collects the keyword(s) from the entered information and performs an analysis and retrieval of related information from the database 104 (e.g., using the index created by the index and search algorithm described above). For example, the source code requirement manager 102a detects the keyword "Portfolio" and requests results that match this keyword from the index in database 104. The database 104 selects the index row(s) that correspond to the "Portfolio" keyword (see FIG. 3) and retrieves related information from a plurality of database tables that contain information relating to the "PortfolioChart" application. The database 104 returns the retrieved information to the source code requirement manager 102a which displays the retrieved information in the interface of the code requirement tool 106.

Section 502 in FIG. 5 corresponds to a plug-in of the source code requirement manager 102a that displays the information and recommendations of code and script elements to be added to the newly-created requirement. For example, the plug-in indicates that the requirement will impact the "PortfolioChart" web service (section 502a) which has a complexity score of two, indicating that it is a relatively less complex web service, as well as a link to the source code file(s) that comprise the web service. The plug-in also includes a button that enables the developer to add the web service to the requirement so that when the requirement is being acted upon, the developer will be directed to analyze and make changes if necessary to the PortfolioChart web service code.

The plug-in also indicates that the requirement will impact the "HelloWorld_Sahi_Script.sah" script file (section 502b) that is used to automatically test the PortfolioChart application on the script execution servers 118. Similarly, the developer can add the test script file to the requirement so that when the requirement is being acted upon, the developer will be directed to analyze and make changes if necessary to the "HelloWorld_Sahi_Script.sah" script file.

In addition, the plug-in includes an area (section 502c) that identifies and lists particular developers that have worked on the related source code and/or test scripts in the recent past (e.g., last six months), including data points such as the success rate for the developer (e.g., the percentage of builds that were successfully deployed and which included the related source code changes that the developer worked on) and the scope of the changes effected by the developer (e.g., how many lines of code were added or changed).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for intelligent automation of computer software test scripts and code requirements, the method comprising:
    automatically scanning, by a server computing device, a plurality of code files stored in a code repository that comprise one or more lines of application source code to identify changes made to the code files, including:
        determining, by the server computing device, whether a timestamp of each of the code files has changed, and
        extracting, by the server computing device, one or more data elements associated with the code file and storing the data elements in a database, if the timestamp of the code file has changed,
        wherein the changes made to the code files include one or more of: changes to a folder structure in which the code file is located, changes to a configuration file of an application associated with the code file, changes to one or more lines of application source code contained in the code file, and changes to a build file of an application in which the code file is included;
    selecting, by the server computing device, one or more test automation script files from a test script repository that are related to the changed code files;
    parsing, by the server computing device, each selected test automation script file to determine whether the selected test automation script file includes changes that correspond to the changes made to the related code files, including:
        extracting, by the server computing device, one or more data elements associated with the selected test automation script file and storing the data elements in the database,
        wherein the changes to the selected test automation script file include one or more of: changes to a folder structure in which the code file is located, and changes to one or more lines of script code contained in the selected test automation script file;
    if the selected test automation script file includes the corresponding changes:
        determining, by the server computing device, whether a current version of the selected test automation script file is located on each of one or more test server computing devices; and
        installing, by the server computing device, the current version of the selected test automation script file on each test server computing device that does not have the current version; and
    if the selected test automation script file does not include the corresponding changes:
        transmitting, by the server computing device, a notification message to a remote computing device to indicate that the selected test automation script file requires the corresponding changes.

2. The method of claim 1, wherein the step of extracting one or more data elements comprises parsing, by the server computing device, the folder structure in which the code file is located to identify at least a portion of the data elements associated with the code file.

3. The method of claim 1, wherein the step of extracting one or more data elements comprises parsing, by the server computing device, the configuration file of an application associated with the code file to identify at least a portion of the data elements associated with the code file.

4. The method of claim 1, wherein the step of extracting one or more data elements comprises parsing, by the server computing device, the one or more lines of application source code contained in the code file to identify at least a portion of the data elements associated with the code file.

5. The method of claim 1, wherein the step of extracting one or more data elements comprises parsing, by the server computing device, the build file of an application in which the code file is included to identify at least a portion of the data elements associated with the code file.

6. The method of claim 1, wherein the step of extracting one or more data elements associated with the selected test automation script file comprises parsing, by the server computing device, the folder structure in which the selected test automation script file is located to identify one or more data elements associated with the selected test automation script file.

7. The method of claim 1, wherein the step of extracting one or more data elements associated with the selected test automation script file comprises parsing, by the server computing device, the one or more lines of script code contained in the selected test automation script file to identify one or more data elements associated with the selected test automation script file.

8. The method of claim 1, further comprising generating, by the server computing device, a search index that aggregates at least a portion of the data elements associated with the code file and at least a portion of the data elements associated with the test automation script file.

9. The method of claim 8, further comprising identifying, by the server computing device, a code file by scanning the search index using one or more of the data elements associated with the test automation script file.

10. The method of claim 8, further comprising identifying, by the server computing device, a test automation script file by scanning the search index using one or more of the data elements associated with the code file.

11. The method of claim 1, further comprising
    determining, by the server computing device, whether the changed code files are included in a code build to be deployed on the test server computing devices; and
    instructing, by the server computing device, the test server computing devices to execute the current versions of the selected test automation scripts if the changed code files are included in the code build.

12. The method of claim 1, further comprising
    receiving, by the server computing device, one or more keywords associated with a code change requirement from an application lifecycle management system;
    identifying, by the server computing device, at least one code file and at least one test automation script file based upon the keywords; and
    linking, by the server computing device, the identified code file and the identified test automation script file to a user interface of the application lifecycle management system.

13. A system for intelligent automation of computer software test scripts and code requirements, the system comprising a server computing device configured to
automatically scan a plurality of code files stored in a code repository that comprise one or more lines of application source code to identify changes made to the code files, including:
determining whether a timestamp of each of the code files has changed, and
extracting one or more data elements associated with the code file and storing the data elements in a database, if the timestamp of the code file has changed,
wherein the changes made to the code files include one or more of: changes to a folder structure in which the code file is located, changes to a configuration file of an application associated with the code file, changes to one or more lines of application source code contained in the code file, and changes to a build file of an application in which the code file is included;
select one or more test automation script files from a test script repository that are related to the changed code files;
parse each selected test automation script file to determine whether the selected test automation script file includes changes that correspond to the changes made to the related code files, including:
extracting one or more data elements associated with the selected test automation script file and storing the data elements in the database,
wherein the changes to the selected test automation script file include one or more of: changes to a folder structure in which the code file is located, and changes to one or more lines of script code contained in the selected test automation script file;
if the selected test automation script file includes the corresponding changes:
determine whether a current version of the selected test automation script file is located on each of one or more test server computing devices; and
install the current version of the selected test automation script file on each test server computing device that does not have the current version; and
if the selected test automation script file does not include the corresponding changes:
transmit a notification message to a remote computing device to indicate that the selected test automation script file requires the corresponding changes.

14. The system of claim 13, wherein extracting one or more data elements comprises parsing the folder structure in which the code file is located to identify at least a portion of the data elements associated with the code file.

15. The system of claim 13, wherein extracting one or more data elements comprises parsing the configuration file of an application associated with the code file to identify at least a portion of the data elements associated with the code file.

16. The system of claim 13, wherein extracting one or more data elements comprises parsing the one or more lines of application source code contained in the code file to identify at least a portion of the data elements associated with the code file.

17. The system of claim 13, wherein extracting one or more data elements comprises parsing the build file of an application in which the code file is included to identify at least a portion of the data elements associated with the code file.

18. The system of claim 13, wherein extracting one or more data elements associated with the selected test automation script file comprises parsing the folder structure in which the selected test automation script file is located to identify one or more data elements associated with the selected test automation script file.

19. The system of claim 13, wherein extracting one or more data elements associated with the selected test automation script file comprises parsing the one or more lines of script code contained in the selected test automation script file to identify one or more data elements associated with the selected test automation script file.

20. The system of claim 13, wherein the server computing device is further configured to generate a search index that aggregates at least a portion of the data elements associated with the code file and at least a portion of the data elements associated with the test automation script file.

21. The system of claim 20, wherein the server computing device is further configured to identify a code file by scanning the search index using one or more of the data elements associated with the test automation script file.

22. The system of claim 20, wherein the server computing device is further configured to identify a test automation script file by scanning the search index using one or more of the data elements associated with the code file.

23. The system of claim 13, wherein the server computing device is further configured to
determine whether the changed code files are included in a code build to be deployed on the test server computing devices; and
instruct the test server computing devices to execute the current versions of the selected test automation scripts if the changed code files are included in the code build.

24. The system of claim 13, wherein the server computing device is further configured to
receive one or more keywords associated with a code change requirement from an application lifecycle management system;
identify at least one code file and at least one test automation script file based upon the keywords; and
link the identified code file and the identified test automation script file to a user interface of the application lifecycle management system.

25. A computer program product, tangibly embodied in a non-transitory computer readable storage device, for intelligent automation of computer software test scripts and code requirements, the computer program product including instructions operable to cause a server computing device to
automatically scan a plurality of code files stored in a code repository that comprise one or more lines of application source code to identify changes made to the code files, including:
determining whether a timestamp of each of the code files has changed, and
extracting one or more data elements associated with the code file and storing the data elements in a database, if the timestamp of the code file has changed,
wherein the changes made to the code files include one or more of: changes to a folder structure in which the code file is located, changes to a configuration file of an application associated with the code file, changes to one or more lines of application source code contained in the code file, and changes to a build file of an application in which the code file is included;

select one or more test automation script files from a test script repository that are related to the changed code files;

parse each selected test automation script file to determine whether the selected test automation script file includes changes that correspond to the changes made to the related code files, including:

extracting one or more data elements associated with the selected test automation script file and storing the data elements in the database, wherein the changes to the selected test automation script file include one or more of: changes to a folder structure in which the code file is located, and changes to one or more lines of script code contained in the selected test automation script file;

if the selected test automation script file includes the corresponding changes:

determine whether a current version of the selected test automation script file is located on each of one or more test server computing devices; and install the current version of the selected test automation script file on each test server computing device that does not have the current version; and if the selected test automation script file does not include the corresponding changes:

transmit a notification message to a remote computing device to indicate that the selected test automation script file requires the corresponding changes.

\* \* \* \* \*